Sept. 10, 1963 SUEKICHI ITO ETAL 3,103,631

RECEIVING SYSTEM IN A SUPERHETERODYNE RADIO RECEIVER

Filed March 6, 1961 3 Sheets-Sheet 1

Suekichi Ito
Tomio Takamura
Kazuhiko Sudo
Inventors
by George B. Oujevolk
Attorney

RECEIVING SYSTEM IN A SUPERHETERODYNE RADIO RECEIVER

Filed March 6, 1961 3 Sheets-Sheet 2

Suekichi Ito
Tomio Takamura
Kazuhiko Sudo
Inventors
by George B. Oujevolk
attorney Suekichi Ito
Tomio Takamura
Kazuhiko Sudo
Inventors
by George B. Oujevolk
Attorney 3,103,631

RECEIVING SYSTEM IN A SUPERHETERODYNE RADIO RECEIVER

Suekichi Ito, 12 Oaza Shimokizaki, Urawa-shi, Saitama-ken, Japan; Tomio Takamura, 894–3 Kamihoya, Hoya-machi, Kitatama-gun, Tokyo-to, Japan; and Kazuhiko Sudo, 372–3 Mitaka-shi, Tokyo-to, Japan Filed Mar. 6, 1961, Ser. No. 93,568
1 Claim. (Cl. 325—439)

This invention relates to superheterodyne type radio receivers, and more particularly it relates to a new receiving system utilizing, together, crystal oscillation and self-oscillation for local oscillation in a superheterodyne type radio receiver.

It is an object of the invention to provide a receiving system wherein, in the case of receiving broadcasts and other communication signals by means of a superheterodyne receiver, by inserting a crystal oscillator of predetermined frequency in a local oscillation circuit, it is possible to adjust easily and, at the same time, to receive stably a special radio wave, and it is possible also to receive other frequencies by self-oscillation in the same manner as in the ordinary case.

It is another object of the invention to provide a novel crystal oscillator composed of two or more crystals, which is capable of producing two or more crystal oscillations, and which is suitable for such uses as that in the receiving system according to the invention.

The manner in which the foregoing as well as other objects and advantages of the present invention, as will become apparent presently, may best be achieved will be understood more fully from a consideration of the following description, taken in conjunction with the accompanying illustrations in which the same and equivalent parts are designated by the same reference letters or numerals, and in which.

Figure 12:
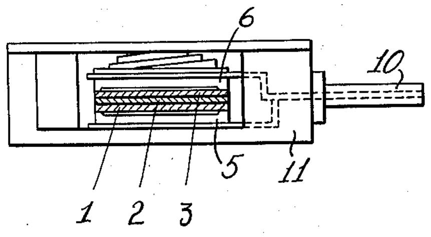
FIG. 12 is a sectioned view along the lines 12—12 of FIG. 11.
Figure 11:
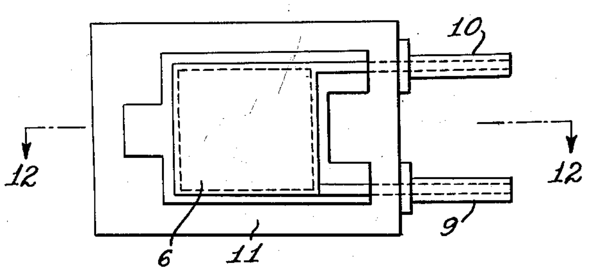
FIG. 11 is a plan view showing one representative embodiment of a crystal oscillator with three crystal pieces inserted in one holder.
Figure 13:
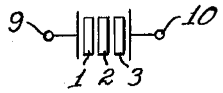
Figure 14:
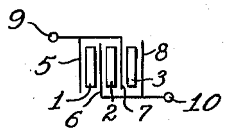
Figure 15:
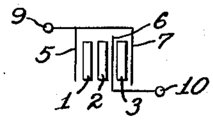
Figure 16:
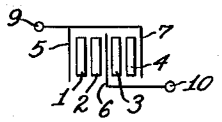

FIGS. 13 through 15 are connection diagrams of three crystal pieces in the oscillator illustrated in FIGS. 11 and 12, and show, respectively, the cases wherein three crystal pieces are connected in series, in parallel, and one crystal is connected in series to a parallel connection consisting of two crystals; and FIG. 16 is a connection diagram of four crystal pieces of another embodiment of this application.

Figure 1:
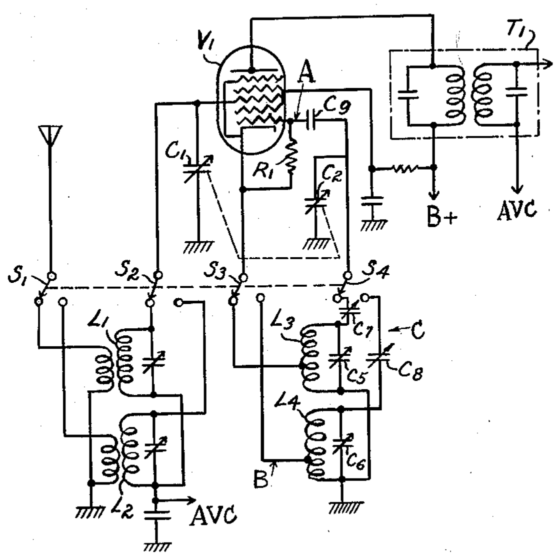
FIG. 1 is a circuit diagram of a converter of an ordinary two-band superheterodyne receiver.
Figure 4:
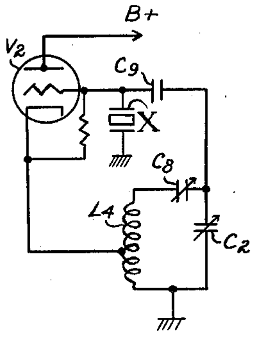
FIGS. 2 to 6 are circuit diagrams showing different local oscillator circuits of a superheterodyne receiver according to the present invention.

The ordinary two-band superheterodyne receiver of FIG. 1 comprises a frequency converting vacuum tube $V_1$, a high frequency tuning condenser $C_1$, a local oscillator variable condenser $C_2$, said condensers $C_1$ and $C_2$ being ganged, semi-fixed trimer-condensers $C_3$, $C_4$, $C_5$ and $C_6$, a semi-fixed padding condenser $C_7$ for intermediate frequency band local oscillator, a semi-fixed padding condenser $C_8$ for short wave band local oscillation, a grid condenser $C_9$ for local oscillation, a high frequency tuning coil $L_1$ for intermediate frequency wave band, a high frequency tuning coil $L_2$ for short wave band, a local oscillator coil $L_3$ for intermediate frequency band, a local oscillator coil $L_4$ for short wave band, a grid resistance $R_1$ for local oscillation, an intermediate frequency transformer $T_1$, and band changing switches $S_1$–$S_4$ which are also ganged.

Figure 2:
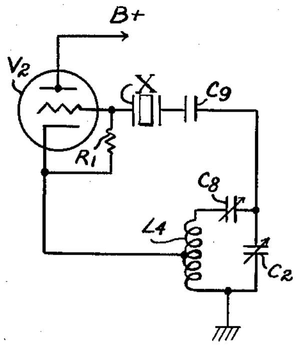
Figure 3:
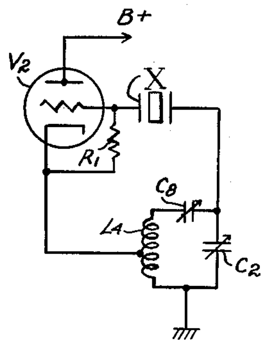
Figure 5:
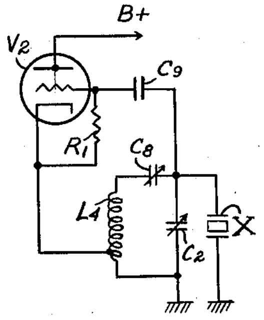
Figure 6:
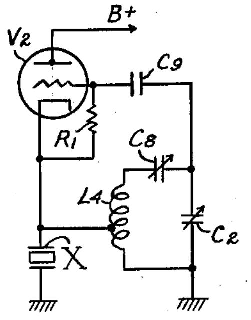

In the local oscillator circuits shown in FIGS. 2 to 6 which are to be used in the superheterodyne receiver of this invention, the same members as those of the circuit of FIG. 1 are designated by the same reference characters except the vacuum tube $V_2$ for the local oscillation and the crystal oscillator X. In the circuit of FIG. 2, the crystal oscillator X is connected in series to the oscillator grid condenser $C_9$; in the circuit of FIG. 3, the crystal oscillator X is used instead of the oscillator grid condenser $C_9$; in the circuit of FIG. 4, the crystal oscillator X is connected between the oscillator grid and ground; in the circuit of FIG. 5, the crystal oscillator X is connected in parallel to the oscillator variable condenser; and in the circuit of FIG. 6, the crystal oscillator X is connected between the cathode of the oscillator vacuum tube $V_2$ and ground.

Figure 7:
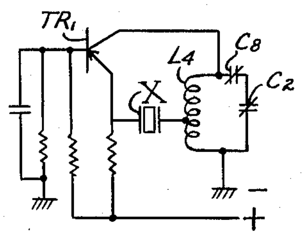
FIGS. 7 to 9 are circuit diagrams showing different local oscillator circuits of a transistor type superheterodyne receiver according to the present invention.
Figure 8:
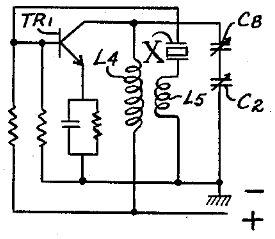
Figure 9:
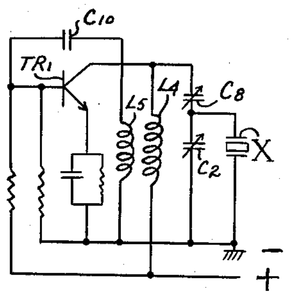

In the local oscillator circuits shown in FIGS. 7, 8, and 9 which are to be used in the transistor type superheterodyne receiver according to the present invention, the reference characters $TR_1$, X, $L_4$, $C_2$, $C_3$, $C_{10}$ and $L_5$ designate, respectively, a local oscillator transistor, a crystal oscillator, a local oscillation coil, a variable condenser for local oscillation, semi-fixed padding condenser for local oscillation, a feed-back condenser, and an oscillator coupling coil.

In the circuit of FIG. 7, the crystal oscillator X is connected in the feed-back circuit of the local oscillator circuit; in the circuit of FIG. 8, the crystal oscillator is connected to the feed-back circuit of the base feed-back type local oscillator circuit; and in the circuit of FIG. 9, the crystal oscillator X is connected in parallel in the local oscillator condenser $C_2$.

Figure 10:
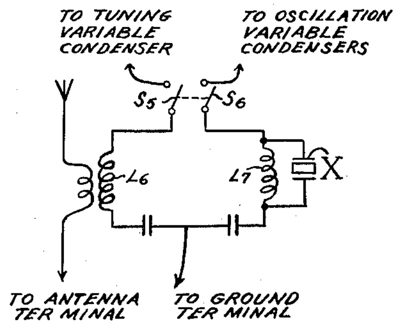
FIG. 10 is a circuit diagram wherein a crystal oscillator is connected in parallel to the local oscillator coil of a so-called "NSB" tuner, i.e., a device capable of receiving short waves by the addition of components for intermediate wave use.

The circuit of FIG. 10, in which the crystal oscillator X is connected in parallel to the local oscillator coil of the NSB tuner, comprises a high frequency tuning coil $L_6$, a local oscillation coil $L_7$, and intermediate frequency-short wave changing switches $S_5$ and $S_6$ which are in ganged state.

In the circuits of FIGS. 11 to 16, the crystal pieces are designated by numerals 1, 2, 3, and 4; electrode plates are designated by numerals 5, 6, 7 and 8; and electrodes and holder are designated, respectively, by 9 and 10, and 11.

In a two-band, superheterodyne receiver of ordinary type for broadcast reception, the adjustment of the variable condenser for reception in the shortwave band (high-frequency band) is extremely difficult, even a slight detuning being sufficient to prevent reception of the intended radio wave. Moreover, even if appropriate adjustment is attained when the use of the receiver is initially begun, the frequency of the local oscillation varies with time because of the variation of temperature within the receiver; consequently, detuning results, and it becomes impossible to receive the desired radio wave.

The above-described disadvantage can be eliminated, and stable reception obtained by the system of the present invention. For example, in the case of receiving a radio wave of 3,925 kc., if the intermediate frequency of the receiver is made to be 455 kc., a crystal oscillator X of 3,925 kc.+455kc.=4,380 kc., frequency is inserted as indicated in FIGS. 2 through 9, inclusively, in one of the positions indicated as A, B, and C in FIG. 1, and the receiver is thus adjusted, the crystal oscillator will oscillate at its natural frequency when the natural frequency of the $L_4C_2C_8$ circuit of FIG. 1 approaches 4,380 kc., and it will be possible to receive, easily, a radio wave of 3,925 kc.

In this case, even if the capacitance of the condenser is varied slightly, the frequency of the crystal oscillation will undergo almost no change. Accordingly, the receiving condition is extremely stable, and even when the temperature within the receiver or the voltage of the power source varies after a long period of reception, almost no detuning occurs.

Furthermore, while the conventional receiver of ordinary type often has the disadvantage of radio interference by waves of frequencies in the proximity of the desired frequency because of poor adjustment, the system of the present invention maintains the receiver constantly in the optimum adjustment condition for reception with an ordinary receiver, and, accordingly, the degree of radio interference by proximate waves is extremely low.

It is common practice in the reception of shortwaves to use radio waves of two or more frequencies because of the nature of shortwave propagation and to receive by selecting the frequency which is most suitable depending on the time and season. In such a case, therefore, if two or more crystal oscillators which have frequencies which are equal to the reception frequency plus or minus the intermediate frequency (455 kc.) are connected in parallel or in series and inserted in the above-described circuit, the respective crystal oscillators will oscillate whenever the natural frequency of the $L_4C_2C_8$ of the local oscillator of the receiver is caused by the tuning of the receiver to approach the oscillation frequencies of these crystal oscillators, whereby it will be possible to receive well a radio wave of a certain predetermined frequency. Since, in this case it is possible to receive the desired radio wave well and in a stable manner over an extremely wide range of rotational angle of the tuning dial as compared to the case of ordinary reception, if the system is utilized for reception in the high-frequency band, adjustment will be extremely easy.

When the system of the present invention is to be used to receive radio waves of frequencies other than the originally intended frequency with the crystal oscillator still inserted, reception is possible in this condition through self-oscillation. Accordingly, when the system is applied to an all-wave receiver, excellent performance is obtained.

Furthermore, when the system of the invention is applied to a five-tube superheterodyne receiver (medium wave) and used simply for an NSB tuner which becomes a two-band receiver, if the above-mentioned crystal oscillator is inserted in parallel with an oscillation coil as indicated in FIG. 10, it will be possible to receive shortwaves stably and easily in the same manner as described above.

Since, especially in the case of portable radios, the tuning dials are small, adjustment by means of a conventional system depending solely on self-oscillation is extremely difficult, but this difficulty can be eliminated by using the system of the present invention in same manner as described above.

In FIGS. 2 through 10, inclusively, the crystal oscillator X inserted at various circuit positions have been diagrammatically represented as being composed of a single crystal, but such representation has been merely for the purpose of illustration and is not intended to limit the number of crystals to be used. That is, two or more crystals may be connected and used as illustrated in FIGS. 11 through 16, inclusively.

FIGS. 11 and 12 show one example of a specific construction of one example of embodiment of the crystal oscillator according to the invention, wherein three crystals 1, 2 and 3 are inserted in a quartz crystal holder of the FT 243 type. The crystals 1, 2 and 3, which have different frequencies, are installed in laminate arrangement, and the combination can be used similarly as an ordinary crystal oscillator. When the internal electrostatic capacity of the crystal oscillator is to be decreased or increased because of such considerations as the position in the oscillation circuit where the crystal oscillator is to be inserted, two or more crystals can be connected in such arrangements as series connection, parallel connection, or series-parallel connection as indicated diagrammatically in FIGS. 13 through 16, inclusively.

In such cases wherein two or more crystal oscillations of different frequencies are required, as in an oscillator for calibration of frequency of a standard signal generator or in the afore-described receiving system as applied to a superheterodyne receiver, the use of the crystal oscillator of the present invention as described above makes it possible to obtain oscillation at one required frequency selected at will from among two or more frequencies by merely moving a variable condenser of the tuning circuit of the oscillator.

In the above case, conventional crystal oscillators cannot be used unless the said crystal oscillators are interchanged or are changed over by means of a switch, whereas, with the crystal oscillator of the present invention, such inconvenience is eliminated. Accordingly, the crystal oscillator of the present invention has the advantage of convenience, economy, and small space requirement.

Since it is obvious that changes and modifications can be made in the above described details without departing from the nature and spirit of the invention, it is to be understood that the invention is not to be limited to the details described herein except as set forth in the appended claim.

We claim:

In a superheterodyne, intermediate frequency type, radio receiving circuit, including a variable condenser tuning stage, a frequency convertor stage having a local oscillator, which circuit also includes crystal oscillators, the number of which correspond to a particular number of received waves; the improvement therein comprising having said crystal oscillators include a holder, at least two crystals having different oscillation natural frequencies, laminated and held by said holder, said crystals being electrically connected by the use of two electrode plates, said crystal oscillators being connected to said local oscillator, the natural oscillation frequency of each of said crystal oscillators being made to differ from the frequency of its particular received wave by said intermediate frequency, said local oscillator stage having a variable condenser including a movable condenser part coupled to the corresponding part of the variable condenser of the tuning stage so that said local oscillator variable condenser is adjusted by the tuning of said tuning stage making the resonant frequency of said local oscillator substantially coincide with the natural oscillation frequency of one of said crystal oscillators, thus enabling stable reception of a selected particular received wave, said local oscillator moreover acting as a self-oscillation circuit when radio waves other than said particular number waves are received so as to provide ordinary reception.

References Cited in the file of this patent

UNITED STATES PATENTS

| | | |
|---|---|---|
| 2,083,420 | Atchison | June 8, 1937 |
| 2,323,924 | Mayer | July 13, 1943 |
| 2,580,051 | Torre et al. | Dec. 25, 1951 |
| 2,887,573 | Hruska | May 19, 1959 |

FOREIGN PATENTS

| | | |
|---|---|---|
| 655,256 | Germany | Jan. 12, 1938 |